United States Patent [19]
Griffiths et al.

[11] Patent Number: 4,776,378
[45] Date of Patent: Oct. 11, 1988

[54] PNEUMATIC TIRE AND WHEELRIM FOR A MOTORCYCLE

[75] Inventors: Gerald A. Griffiths; Peter Ingley; David R. Watkins, all of Birmingham, England

[73] Assignee: Sp Tyres UK Limited, Birmingham, United Kingdom

[21] Appl. No.: 886,091

[22] Filed: Jul. 16, 1986

[30] Foreign Application Priority Data

Jul. 16, 1985 [GB] United Kingdom ............... 8517959

[51] Int. Cl.⁴ ............................................. B60C 3/04
[52] U.S. Cl. .................... 152/454; 152/209 R; 152/378 R; 152/393; 152/538; 152/560
[58] Field of Search ............... 152/454, 548, 560, 516, 152/517, 530, 378 R, 393, 538, 209 WT, 209 NT, 165, 166

[56] References Cited

U.S. PATENT DOCUMENTS 2,477,754  8/1949  Kraft .................................. 152/166
4,467,852  8/1984  Ippen et al. ..................... 152/454 X

FOREIGN PATENT DOCUMENTS 534223  12/1956  Canada ............................. 152/454
2120179  11/1983  United Kingdom ............ 152/454

Primary Examiner—Robert A. Dawson
Assistant Examiner—Thomas Bokan
Attorney, Agent, or Firm—Birch, Stewart, Kolasch & Birch

[57] ABSTRACT

A pneumatic tire and wheelrim assembly for a motorcycle wherein the tire comprises a pair of axially spaced wheelrim engaging bead regions, a torroidal air pressure retaining carcass reinforced by a reinforced ply extending from one bead region to the other bead region, a round contacting tread which is curved in radial cross-section of the tire and which terminates adjacent to each bead region as a shoulder of the tread characterized by said shoulder having a radially inwardly facing shoulder formation and wherein the wheelrim comprises a pair of axially spaced bead seats, one for each bead region of the tire said bead seat extending axially outwardly as radially engagement positions which are complementary to the shoulder formation so that in the assembled tire and wheelrim the tread is easily located directly by the intergagement of the shoulder formations and the engagement portion.

7 Claims, 1 Drawing Sheet

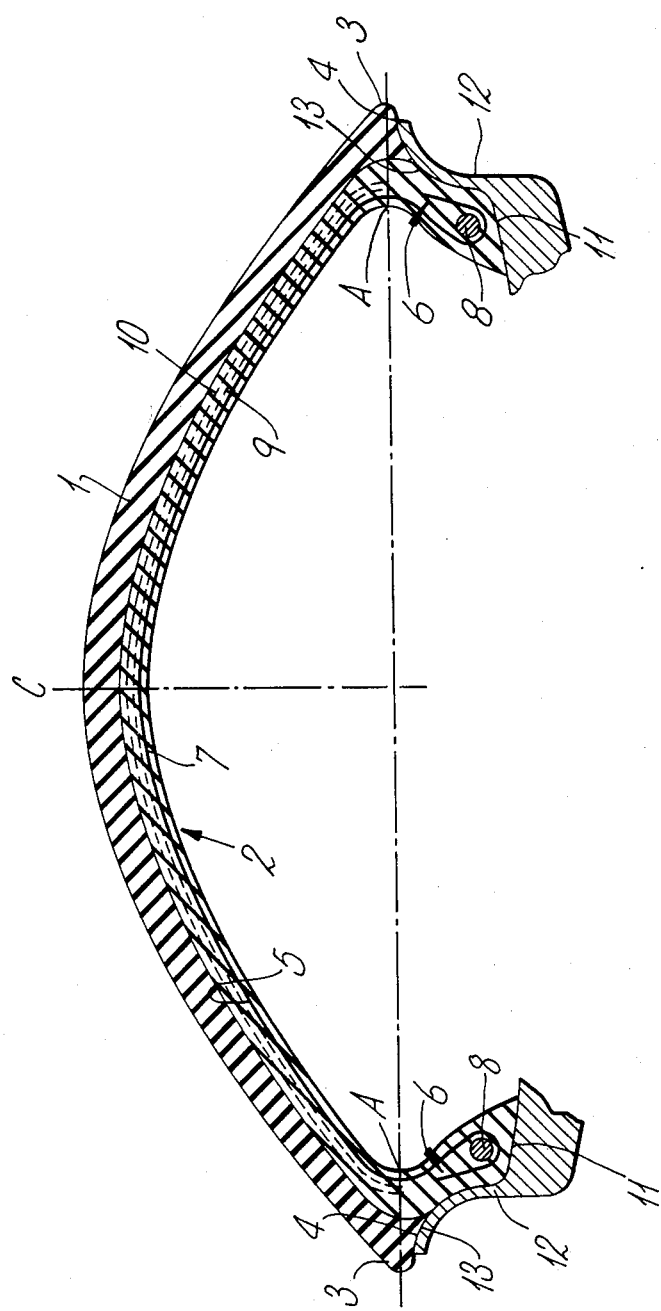

PNEUMATIC TIRE AND WHEELRIM FOR A MOTORCYCLE

The present invention relates to motorcycle tires and in particular to tires for high performance and racing motorcycles.

When considered in cross section such tires have sharply curved tread regions which are specially reinforced to provide the necessary tread stability for vehicle stability and steering response. Conventionally the edges or shoulders of the tread region are connected to the wheelrim by reinforced sidewalls and wheel/engaging bead regions and these regions too have direct influence on the vehicle characteristics.

An object of the present invention is to still further improve tread stability so that the tires may provide even better handling characteristics for the vehicle.

Accordingly, one aspect of the present invention is to provide a pneumatic tire and wheelrim assembly for a motorcycle wherein the tire comprises a pair of axially spaced wheelrim engaging bead regions, a torroidal air pressure retaining carcass reinforced by a reinforcement ply extending from one bead region to the other bead region, a ground contacting tread which is substantially curved in radial cross-section of the tire and which terminates adjacent to each bead region in a shoulder of the tread the said shoulder having a radially inwardly facing shoulder formation and the wheelrim comprises a pair of axially spaced bead seats, one for each bead region of the tire. Adjacent each beadseat and extending axially outwards thereof is a radially projecting engagement portion which is complementary to the shoulder formation so that in the assembled tire and wheelrim the tread is radially located directly by the interengagement of the shoulder formations and the engagement portions.

This tire thus has no sidewalls in the conventional sense and the tread is directly located by the wheelrim. Preferably the shoulder formation also faces axially outwardly of the tire and the complementary engagement portions face axially inward so that increased axial location of the tread on the wheelrim is provided. The tire is preferably a radial ply tire or substantially a radial ply tire with a tread reinforcing member in the tread.

The tread reinforcement preferably extends parallel to the ground contacting surface of the tread and into both shoulders such that the tread reinforcement in the shoulders is substantially perpendicular to the interengaging surface and the location thus also acts directly on the tread reinforcement. The carcass reinforcement ply may also approach the shoulders substantially perpendicularly and then bend sharply axially and radially inwards towards the bead region.

Another aspect of the present invention provides a tire for the tire and wheelrim assembly above in which the reinforcement ply may be wrapped around an annular bead reinforcement hoop in each bead region. The carcass may have one, two or more reinforcement plies and may have the cords of the plies at 70°-90° to the circumferential direction to provide a basic radial tire type of carcass. The tread is preferably additionally reinforced for example by a breaker ply or plies arranged parallel to the ground contacting surface and carcass reinforcement. Preferably the breaker ply or plies extends right into the shoulder regions.

Further aspects of the present invention will be apparent from the following description, by way of example only, of one embodiment of the invention in conjunction with the attached diagramatic drawing which is a transverse cross section of a tire and wheel rim.

The tire is a radial ply racing motorcycle tire of the slick or tread patternless type and is mounted on a wheelrim which has a conventional fitting well, not shown. The tire comprises a tread region which has a markedly convex cross section to provide for banking of the machine and a torroidal carcass 2 which together with the wheelrim forms the air containing chamber for the assembly.

The tread region 1 terminates at either side in a shoulder 3 which has a radially inwardly and axially outwardly facing concave abutment face 4. The abutment face 4 provides effectively the tread edge.

The carcass 2 comprises a carcass crown 5 which extends beneath the tread 1 from the centerline of the tire C to each side at the points A. Beginning at the points A the carcass has a pair of bead regions 6, each of which is adapted to fit the wheelrim and provide an air seal and a mechanical engagement in the conventional manner. The carcass 2 is reinforced by a single ply 7 of the tire cord fabric (shown by a continuous line) which extends from one bead to the other around the carcass and which is, in each bead region 6, wrapped around a steel cord bead reinforcement hoop 8. The reinforcement ply 7 comprises rayon cords laid at an angle of 88° to the circumferential direction to provide a radial ply of reinforcement.

The carcass 2 also includes two plies of tread reinforcement or breaker layers 9 and 10 (both shown by broken lines). These breaker plies 9 and 10 comprise steelcord tire breaker fabric and the cords of each ply are laid in opposing senses at an angle of 21° to the centreline of the tread around the tire. Most importantly both breakers 9 and 10 extend to the tread edges 3 and thus terminate close to the abutment face 4.

The wheelrim comprises a pair of axially spaced apart tapered bead seats 11 and radially outwardly projecting flanges 12 but the flanges 12 continue radially outwardly and curve axially outwardly to provide substantial curved abutment faces 13 adjacent to the tread edge faces 4.

In the normal unloaded inflated condition the abutment faces 4 at the tread edges are in contact with the abutment faces 13 on the wheelrim. Thus in use, the tread of the tire together with its reinforcement or breaker package is positively located by the mechanical engagement of the wheelrim. The resultant assembly, in having no sidewalls to provide a flexible connection between the wheelrim and tyre bead, provides greatly improved steering response and handling in a motorcycle.

Many different carcass constructions may be used including monoply reinforcements and cross ply carcass constructions. The tire may have different breaker constructions or indeed no breaker at all. Ply and breaker fabric materials may be any of those known in the art dependent on the particular tire structural properties required. Furthermore the tire tread may be patterned as well as smooth.

The tire beads may be of different constructions and use alternative reinforcement hoops and it is believed that the direct tread support system, in removing the need for the bead to be constructed to give support to the sidewalls, allows simplier beads to be utilised than hitherto.

It is considered that the most important properties of the tire are that the torroidal air retaining chamber is substantially separate from the tread locating features and thus both may be optimised.

Having now described our invention what we claim is:

1. A pneumatic tire and wheelrim assembly for a motorcycle wherein the tire, which does not contain sidewalls comprises a pair of axially spaced wheelrim engaging bead regions, a torroidal air pressure retaining carcass reinforced by a reinforcement ply extending from one bead region to the other bead region, a ground contacting tread which is curved in radial cross-section of the tire and which extends to and terminates adjacent to each bead region as a shoulder member of the tread, wherein said shoulder member and bead region have a radially inwardly facing concave abutment face and wherein the wheelrim comprises a pair of axially spaced bead seats, one for each bead region of the tire, said bead seats extending axially outwardly as radially projecting, convex engagement flanges which are complementary to and in engaging relationship with the shoulder members and bead regions so that in the assembled tire and wheelrim composite, the tread is directly connected to the engagement flanges of the bead seats through the interengagement with said shoulder members and bead regions whereby the shoulder members provide stabilization for the tread region.

2. The pneumatic tire and wheelrim assembly according to claim 1 wherein the shoulder members in addition face axially outwardly of the tire and the complementary engagement flanges face axially inwardly so that increased axial location of the tread on the wheelrim is provided.

3. The pneumatic tire and wheelrim according to claim 1 wherein the carcass reinforcement ply is a substantially radial reinforcement ply with its cords at 70° to 90° to the circumferential direction of the tire and the tread is reinforced by at least one tread reinforcing breaker which extends parallel to the ground contacting surface of the tread and into both shoulder members such that the breaker is substantially perpendicular to the interengaging surfaces.

4. The pneumatic tire and wheelrim according to claim 3 wherein the carcass reinforcement beneath the tread extends substantially parallel to the ground contacting surface of the tread into both shoulder members of the tread such that the reinforcement ply is substantially perpendicular to the interengaging faces and the location acts on the carcass reinforcement.

5. The pneumatic tire according to claim 4 wherein the reinforcement ply into the shoulder members bends sharply axially and radially inwardly towards the bead region.

6. The pneumatic tire for the tire and wheelrim assembly of claim 1 wherein an annular bead reinforcement hoop is disposed in each bead region and the reinforcement ply wraps around said annular bead.

7. The pneumatic tire according to claim 5 wherein the carcass reinforcement ply comprises two plies.

* * * * *